United States Patent Office 2,940,815
Patented June 14, 1960

2,940,815
VAT DYE COMPOSITIONS CONTAINING BENZOTRIAZOLES

John Taras, Alpha, N.J., assignor to General Aniline & Film Corporation, New York, N.Y., a corporation of Delaware No Drawing. Filed Dec. 4, 1953, Ser. No. 396,350

6 Claims. (Cl. 8—35)

This invention relates to vat dye compositions and particularly to vat dyestuff compositions containing benzotriazoles for the printing of textile fibers.

The printing of textile materials with ester salts of leuco vat dyestuffs is well known to the art. The process involves dissolving the ester salt of the leuco vat dyestuff in water and adding a thickening agent to form the printing paste which is applied to the textile material in several known ways, after which the insoluble parent vat dyestuff is fixed on the fibers by the hydrolysis and oxidation which takes place in the "ageing" process which is generally one of two kinds. In the acid ageing process for the development of the print, acid steam is applied along with treatment of the impregnated fabric with an acid solution of an oxidizing agent. Where an acid-liberating agent and an oxidizing agent have been incorporated in the printing paste, development of the print takes place with the application of ordinary steam. The printed material is then rinsed, soaped and finished.

The solubility in water of the ester salts of the leuco vat dyestuffs is due to the presence in the molecule of one or more polybasic and ester groups. This solubility varies, widely and is dependent chiefly on the character of the parent vat dyestuff. In the case of the sodium salts of the sulfuric acid esters of the leuco vat dyestuffs, some of these are easily soluble in water, whereas others, being considerably less soluble, are readily salted out by the presence in the printing paste of electrolytes usually employed in the printing, most commonly ammonium thiocyanate for the acid-liberating function, and sodium chlorate for the oxidation step. The selection of vat dyestuffs for use in the printing of textiles is accordingly limited to those, the leuco ester salts of which possess the required solubility in water.

In the interest of providing stable printing pastes containing a soluble salt of the sulfuric acid ester of leuco vat dyestuffs and of employing therein leuco ester salts of low solubility, thus to provide a wider range of selection in the vat dyestuffs, more work has been done by way of adding to the printing compositions various quantities of organic solvents such as alcohols, ethylene glycol, etc., and of other printing assistants of a variety of chemical species. Despite the many excellent printing assistants which have been added to printing pastes, there are certain vat dyestuffs, for example, 2,1-naphthio-indigo, which yield sulfuric acid ester salts which are so difficultly soluble in water which renders printing impossible unless there is formulated into the print paste certain so-called solubilizing agents.

I have found that improved dyestuff compositions containing salts of polybasic acid esters, especially sulfuric acid esters of leuco vat dyestuffs (hereinafter referred to for sake of simplicity as ester salts of leuco vat dyestuffs) are readily obtained by incorporating with the ester salt of the leuco vat dyestuff a benzotriazole which is characterized by the following general formulae:

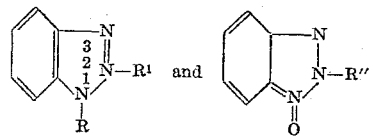

wherein R represents either hydrogen, lower alkyl, e.g., methyl, ethyl; hydroxy, hydroxyphenyl, or acetyl, $R^1$ represents either hydrogen, lower alkyl as in R or carboxymethyl, and $R''$ represents aryl of the benzene series, e.g. phenyl, tolyl, hydroxyphenyl, carboxyphenyl, etc.

As examples of such benzotriazoles the following are illustrative:

Benzotriazole
1-methyl benzotriazole
1-ethyl benzotriazole
1-acetyl benzotriazole
1-hydroxy benzotriazole
2-methylbenzotriazole
2-benzotriazole acetic acid
1-[4-hydroxyphenyl]-benzotriazole
2-[4-hydroxyphenyl]-benzotriazole
2-[4-hydroxy-3-carboxyphenyl]-benzotriazole
2-phenylbenzotriazole-1-oxide
2-p-tolylbenzotriazole-1-oxide
2-[4-hydroxyphenyl]-benzotriazole The incorporation of the foregoing benzotriazoles into compositions of ester salts of leuco vat dyestuffs not only improves the solubility of the less soluble ester salts of the leuco vat dyestuffs, but also yields superior print paste stability, superior tinctorial quality of the textile prints, both in respect to tinctorial strength and brilliancy, and superior print paste solubility.

The benzotriazole compounds may be incorporated directly into the printing pastes, or they may be first mixed with the ester salt of the leuco vat dyestuff. They may be used singly or in admixture with one another. The amount of the benzotriazoles or mixtures thereof which may be incorporated into the dyestuff composition may be very considerable. For example, the amount utilized in one case may depend upon the solubility of the ester salt of the vat dyestuff as well as the activity of the particular benzotriazole or benzotriazole mixture employed. For practical purposes regardless of the solubility of the ester salt of the vat dyestuff, we have found that superior print paste solubility, superior tinctorial properties and superior print paste stability are obtained when from about one-quarter to four parts by weight of the benzotriazole compound or mixtures thereof are used for each part of the parent vat dyestuff of the ester salt. In addition, in many cases an excess of the benzotriazole or mixtures thereof may be used, the excess merely acting as a diluent. The unusual aspect of the benzotriazoles and mixtures thereof is that they do not interfere with the other agents normally employed in the preparation of printing pastes containing salts of sulfuric acid esters of leuco vat dyestuffs. Thus, in preparing printing pastes or powders with these vat dyestuff ester salts, the benzotriazoles or mixtures thereof may be used to replace part of the water or the solid diluent in the standardization of the dyestuff composition. Additional substances having diluent, anti-foaming, wetting, catalytic or other desired action, may be included in the dyestuff compositions prepared in accordance with the present invention. The various substances that may be so employed are well known to the art and need not be exemplified herein. However, for purposes of specific illustration such substances as sodium sulfate or sodium carbonate will serve as diluents or alkaline agents, organic fillers such as dextrose, dextrines and the like, and catalytic substances such as ammonium vanadate and the like.

The ester salts of leuco vat dyestuffs useful in the preparation of the printing paste compositions of the present invention include all of those that are prepared from various clasess of vat dyestuffs such as, for example, vat dyestuffs containing the anthraquinone-acridine, dibenzanthrone, isodibenzanthrone, anthanthrone, dianthraquinone-azine, anthraquinone-diphenylthiazole, nucleus and the like, which may be found in various literature including the "Colour Index" No. 1094ff and 1177ff, pages 248–291. Inclusive of such dyes are also leuco ester salts of vat dyes and leuco compounds of vat dyes prepared by careful acidification of an alkaline vat. A particularly valuable class of these ester compounds of the alkali metal, such as sodium and potassium and amine salts, such as trimethyl amine and triethanol amine salts of polybasic acid esters of leuco vat dyestuffs. The polybasic acid esters may be prepared either from sulfuric or phosphoric acid.

By the term "leuco vat dyestuffs" as employed herein is meant the reduced or vatted form of anthraquinone, indigoid or thioindigoid dyestuffs, such as those described in U.S.P. 1,639,206; 1,668,392; 1,747,107; 1,646,018, 1,448,251, 1,448,231, 1,880,996, 1,826,720; British Patents 473,471 and 438,841, German Patents 441,101, 516,845, 486,174, 491,876, and the like. While the benzotriazoles of the present invention may be used with all of the classes of salts of esters and leuco vat dyestuffs they are especially adaptable for the less soluble leuco vat dyestuffs.

As specific examples of the salts of the polybasic acid esters of the lueco form of vat dyes which may be employed in the preparation of printing paste compositions, the following are illustrative:

(1) The disodium salt of the disulfuric acid ester of the leuco form of the anthraquinone-acridine dye of the following formula:

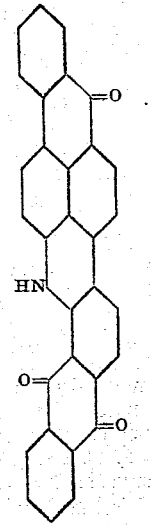

(2) The disodium salt of the disulfuric acid ester of the leuco form of the dinaphthioindigo of the following formula:

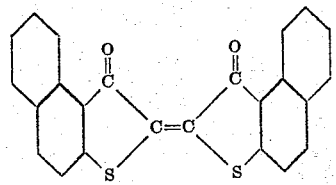

(3) Disodium salt of the sulfuric acid ester of the leuco form of 2,1,5,4-anthraquinone-di-phenylthiazole of the following formula:

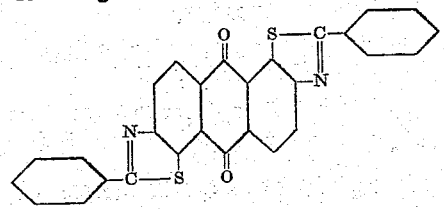

(4) Disodium salt of the sulfuric acid ester of the leuco form of the dibromo-anthanthrone of the following formula:

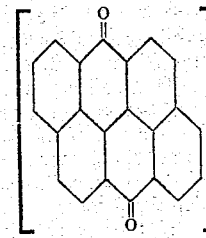

(5) Disodium salt of the sulfuric acid of the leuco compound of chlorinated iso-dibenzanthrone of the following formula:

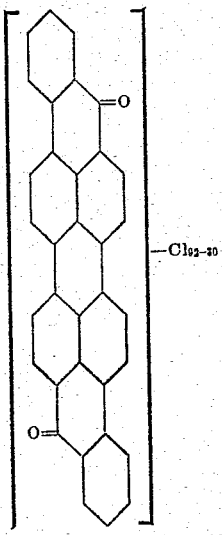

(6) Tetra-potassium salt of the sulfuric acid ester of 3,3'-dichloro-di-anthrahydroquinone azine of the following formula:

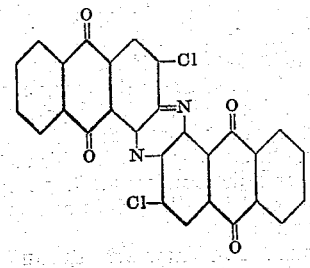

(7) Dipotassium salt of the acid sulfuric acid of the leuco compound of dimethoxy-dibenzanthrone:

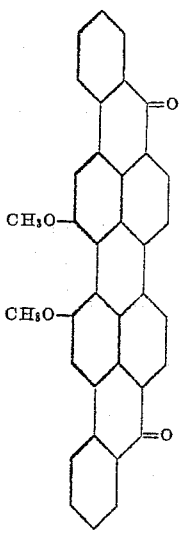

(8) Dipotassium salt of the acid sulfuric acid ester of the leuco compound of dimethyl-dibenzanthrone of the following formula:

(9) Dipotassium salt of the sulfuric acid ester of the leuco form of dinaphthioindigo of illustration (2).

The following examples will show the manner in which the present invention may be practiced. All the parts given therein are by weight unless otherwise specified. It is to be noted, however, that the invention is not to be limited to these examples since many changes may be made in the materials treated and their proportions, manipulative steps, and other conditions without departing from the scope and spirit of the invention claimed.

*Example I*

A. A print paste is prepared from the following dyestuff composition:

4 parts of a dry dyestuff powder containing the sodium salt of the sulfuric acid ester of the leuco compound of the anthraquinone acridine of illustration 1 (equivalent of 1.06 parts of the parent vat dyestuff)
1 part of benzotriazole
4 parts β,β'-dihydroxy diethyl sulfide
4 parts of a 35% sodium chlorate solution
17 parts warm water. The mixture is dissolved by holding in a boiling water bath for two minutes The solution is then mixed with 60 parts of starch-tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the benzotriazole is omitted.

Cotton cloth is printed with a portion of each of the printing pastes A and B. After drying, the printed cloth is subjected to a steam ageing process by exposing it for about 10 minutes to the action of steam. The development is complete after the cotton cloth is subjected to rinsing, soaping and finishing in the usual manner.

The printing paste prepared from the dyestuff composition A containing benzotriazole yields an olive green shade which is stronger, brighter and more level than that produced with the printing paste made from the dyestuff composition B not compounded with the benzotriazole.

*Example II*

A. A powdered dyestuff composition is prepared by grinding together in the dry state, screening and milling.

100 parts of a dry dyestuff composition containing
40.2 parts of the same parent vat dye used in Example I
40 parts of 1-methyl benzotriazole
13 parts "Cerelose" (d-glucose powder)

The final concentration of the vat dyestuff in the dry composition is 26.6%.

B. A powdered dyestuff composition is made up as in A with the exception that the 1-methyl benzotriazole is omitted and 40 parts d-glucose added, so that a total of
53 parts of the diluent, d-glucose is present The concentration of the vat dyestuff in the dry composition is the same as in A (26.6%).

A printing paste is prepared from each of these dyestuff compositions, A and B, in the following manner:

4 parts each of the dyestuff compositions A and B is separately mixed with
4 parts β,β'-dihydroxydiethylsulfide
4 parts urea and finally dissolving by adding
18 parts warm water and holding in a boiling bath for two minutes These solutions are then each mixed with:

60 parts starch tragacanth thickening and
4 parts of a 35% sodium chlorate solution
2 parts 1% ammonium vanadate solution
2 parts 28% ammonia
2 parts 50% gluconic acid solution Cotton cloth is printed with a portion of each of the printing pastes as they are prepared. The printing is performed as in Example I.

The printing paste prepared from the dyestuff composition A containing 1-methyl benzotriazole yields an olive green shade which is stronger, brighter and more level than that produced with the printing paste made from the dyestuff composition B not compounded with 1-methyl benzotriazole.

*Example III*

A. A print paste is prepared from the following dyestuff composition:

4 parts of a dry dyestuff composition containing
1.06 parts of the same vat dyestuff used in Example I
2 parts 1-ethyl benzotriazole
4 parts β,β'-dihydroxydiethylsulfide
4 parts urea and finally dissolving by adding
15.0 parts warm water and holding in a water bath for two minutes The solution is then mixed with:

60 parts starch tragacanth thickening and
4 parts 25% sodium chlorate solution
2 parts 1% ammonium vanadate solution
1 part 28% ammonia and
4 parts ammonium sulfocyanide B. A print paste is prepared as in A with the exception that the 1-ethyl benzotriazole is omitted and water is substituted for it.

Cotton prints are made from each of these printing compositions.

The cotton prints obtained from the composition A formulated with 1-ethyl benzotriazole are stronger and brighter than those obtained from B.

*Example IV*

A. A print paste is prepared as follows:

4 parts of a paste composition containing the dipotassium salt of the acid sulfuric acid ester of the leuco compound of dimethoxy-dibenzanthrone of illustration 7 (equivalent to 0.54 part of the parent vat dye)
½ part 1-hydroxy benzotriazole
4 parts β,β'-dihydroxy-diethyl sulfide
4 parts urea and finally dissolving by adding
16.5 parts warm water and holding in a boiling water bath for 2 minutes The solution is then mixed with 60 parts starch tragacanth thickening and
4 parts 35% sodium chlorate solution
2 parts 1% ammonium vanadate solution
2 parts 28% ammonia
2 parts 50% gluconic acid solution B. A print paste is prepared as in A but the 1-hydroxy benzotriazole is omitted.

Cotton cloth is printed with a portion of each of the print pastes A and B.

The prints obtained from print paste A were stronger and brighter than those obtained from print paste B formulated without the 1-hydroxy benzotriazole.

*Example V*

A. A print paste is prepared from the following dyestuff composition:

4 parts of a dry dyestuff composition containing the disodium salt of the acid sulfuric acid ester of the leuco compound of chlorinated iso-dibenzanthrone (mixture of di- and tri-chlorinated iso-dibenzanthrone) of illustration 5 (equivalent to 1.05 parts of the parent vat dye)
2 parts 1-acetyl benzotriazole
4 parts β,β'-dihydroxy-diethyl sulfide
4 parts urea and finally dissolving by adding
16 parts warm water and holding in a boiling water bath for 2 minutes The solution is then mixed with 60 parts starch tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the 1-acetyl benzotriazole is omitted.

Cotton cloth is printed with a portion of each of the printing pastes A and B.

The printing paste prepared from the dyestuff composition A containing 1-acetyl benzotriazole yields prints that are stronger and brighter than those obtained from printing composition B.

*Example VI*

A. A print paste is prepared from the following dyestuff composition:

4 parts of the same dry dyestuff composition used in Example V
1 part 2-phenyl-benzotriazole-1-oxide
4 parts β,β'-dihydroxy-diethyl sulfide
4 parts urea and finally dissolving by adding
16 parts warm water and holding in a water bath for 2 minutes The solution is then mixed with 60 parts starch tragacanth thickening and
4 parts 25% sodium chlorate solution
2 parts 1% ammonium vanadate solution
1 part 28% ammonia and
4 parts ammonium sulfocyanide B. A print paste is prepared as in A with the exception that the 2-phenyl-benzotriazole-1-oxide is omitted and water is substituted for it.

Cotton prints are made from each of these printing compositions.

The cotton prints obtained from the composition A formulated with 2-phenyl-benzotriazole-1-oxide were tinctorially much stronger and brighter than those obtained from B.

*Example VII*

A print paste is prepared as follows:

4 parts of a dry dyestuff composition containing the disodium salt of the sulfuric acid ester of the dye of illustration 3 (equivalent to 1.04 parts of the parent vat dye)
1 part 2-[4-hydroxyphenyl]benzotriazole-1-oxide
4 parts β,β'-dihydroxy-diethyl sulfide
16 parts warm water and holding in a boiling water bath for 2 minutes The solution is then mixed with 60 parts starch tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the 2-[4-hydroxyphenyl]benzotriazole-1-oxide is omitted.

Cotton cloth is printed with a portion of each of the printing pastes A and B.

The printing paste A containing 2-[4-hydroxyphenyl]-benzotriazole-1-oxide yields prints that are stronger and brighter than the prints obtained from printing composition B.

*Example VIII*

A. A print paste is prepared as follows:

4 parts of a dry powder containing
1.04 parts of the same parent vat dye used in Example VII
2 parts benzotriazole
4 parts β,β'-dihydroxy-diethyl sulfide and
4 parts urea and finally dissolved by
15 parts warm water and holding in a water bath for 2 minutes The solution is then mixed with 60 parts starch tragacanth thickening and
4 parts 25% sodium chlorate solution
2 parts 1% ammonium vanadate solution
1 part 25% ammonia and
4 parts ammonium sulfocyanide B. A print paste is prepared as in A with the exception that the benzotriazole is omitted and water substituted for it.

Cotton prints are made from each of these printing compositions.

The cotton prints obtained from the composition A formulated with benzotriazole are much stronger and brighter than those obtained from B.

Example IX

A. A print paste is prepared from the following dyestuff composition.

4 parts of a dry dyestuff composition containing the disodium salt of the sulfuric acid ester of the leuco compound of dibromo-dibenz-pyrene (equivalent to 1.0 part of the parent vat dye)

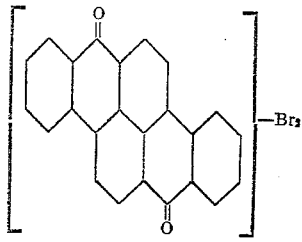

2 parts benzotriazole
4 parts β,β'-dihydroxy-diethylsulfide
4 parts urea and finally dissolving by adding
16 parts of warm water and holding in a boiling water bath for 2 minutes The solution is then mixed with:

60 parts of starch-tragacanth thickening and
4 parts of a 35% sodium chlorate solution
2 parts 1% ammonium vanadate solution
2 parts 28% ammonia
2 parts 50% gluconic acid solution B. A print paste is prepared as in A with the exception that the benzotriazole is omitted and 18 parts of water are used instead of the 16 parts used in A.

Cotton cloth is printed with a portion of each of the printing pastes A and B.

The cotton prints obtained from the composition A formulated with benzotriazole is stronger, smoother and brighter than those obtained from B.

Another portion each of the printing pastes is permitted to stand for 7 days, then printed. The prints made from the composition containing benzotriazole were much stronger and smoother than those obtained from the composition without benzotriazole.

Example X

A. A print paste is prepared from the following dyestuff composition.

4 parts of a dry dyestuff composition containing
1 part of the parent vat dye used in Example IX
2 parts benzotriazole
4 parts β,β'-dihydroxy-diethylsulfide and
4 parts urea and finally dissolved by 15 parts of warm water and holding in a water bath for two minutes The solution is then mixed with:

60 parts starch-tragacanth thickening and
4 parts 25% sodium chlorate solution
2 parts 1% ammonium vanadate solution
1 part 28% ammonia and
4 parts ammonium sulfocyanate B. A print paste is prepared as in A with the exception that the benzotriazole is omitted and water substituted for it.

Cotton prints are made from each of the printing compositions.

The cotton prints obtained from the composition A formulated with benzotriazole are stronger, brighter and smoother than those obtained from B.

Another portion each of the printing paste is permitted to stand for 7 days, then printed. The prints made from the composition containing benzotriazole were stronger and brighter than those obtained from the composition without benzotriazole.

I claim:

1. A dyestuff composition comprising a salt of an acid polybasic acid ester of a leuco vat dyestuff and a benzotriazole selected from the class consisting of the following formulae:

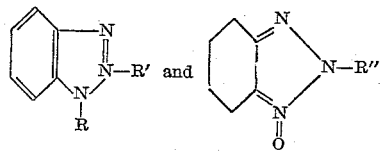

wherein R represents a member selected from the class consisting of acetyl, hydrogen, hydroxy, methyl and ethyl groups, R' represents a member selected from the class consisting of hydrogen, methyl, ethyl, and carboxymethyl groups, and R" represents a member selected from the class consisting of phenyl, hydroxyphenyl and tolyl groups.

2. A dyestuff composition according to claim 1 wherein the benzotriazole is benzotriazole.

3. A dyestuff composition according to claim 1 wherein the benzotriazole is 1-methyl benzotriazole.

4. A dyestuff composition according to claim 1 wherein the benzotriazole is 1-ethyl benzotriazole.

5. A dyestuff composition according to claim 1 wherein the benzotriazole is 1-hydroxy benzotriazole.

6. A dyestuff composition according to claim 1 wherein the benzotriazole is 2-phenyl benzotriazole-1-oxide.

References Cited in the file of this patent

UNITED STATES PATENTS

| | | |
|---|---|---|
| 2,024,502 | Berthold | Dec. 17, 1935 |
| 2,372,370 | Duport | Mar. 27, 1945 |
| 2,389,245 | Wiazmitinow | Nov. 20, 1945 |
| 2,406,586 | Clark | Aug. 27, 1946 |
| 2,540,799 | Taras | Feb. 6, 1951 |
| 2,559,807 | Topham | July 10, 1951 |

UNITED STATES PATENT OFFICE

CERTIFICATE OF CORRECTION

Patent No. 2,940,815             June 14, 1960

John Taras

It is hereby certified that error appears in the printed specification of the above numbered patent requiring correction and that the said Letters Patent should read as corrected below.

Column 4, line 50, formula (5), for that portion reading "—$Cl_{92-30}$" read -- —$Cl_{(2-3)}$ --; column 5, line 73, Example I, for "4 parts of a 35% sodium chlorate solution" read -- 4 parts of urea and --.

Signed and sealed this 31st day of January 1961.

(SEAL)
Attest:

KARL H. AXLINE                             ROBERT C. WATSON
Attesting Officer                          Commissioner of Patents